3,031,441
PROCESS FOR PREPARING POLYBUTADIENES
Albert Verheyden, 15 Kleine Gentstraat, St. Denis-Westrem, Belgium, and Paul Ochsner, 10 Rue de la Dole, Geneva, Switzerland
No Drawing. Filed May 26, 1958, Ser. No. 737,513
Claims priority, application Belgium June 6, 1957
15 Claims. (Cl. 260—94.3)

By polymerization of diolefines, polymers are obtained whose structure varies with the compositions of the catalysts used. The Belgian Patent 549,554 filed on July 14, 1956 by Montecatini discloses the polymerization of butadiene with specific catalysts, the polymers prepared having 1,2-addition units. These catalysts are obtained by reacting an organometallic compound of a metal of the groups I, II or III of the periodic classification of the elements with an oxyderivative of a transition metal of the groups IV, V or VI of the same classification.

The present invention is relating to the polymerization of 1,3-butadiene in the form of non-sticky solids with a high ratio of 1,2-addition units wherein new catalysts are used. The new catalysts are obtained by reacting an organosodium compound with a derivative of a metal of the groups VII and VIII of the periodic classification of the elements. The mechanical properties of the polymers prepared are improved by addition of small amounts of an organozinc or an organocadmium compound.

The organosodium compound is generally amylsodium. The organosodium compounds are prepared by known methods and, for instance, by reacting finely divided metallic sodium and alkyl chloride.

The organozinc and organocadmium compounds are obtained by known methods.

The derivatives of the metals of the groups VII and VIII used for the preparation of the catalysts are for instance anhydrous chlorides of manganese, iron, nickel and cobalt. Oxyorganoderivatives may also be used such as nickel and cobalt acetylacetonates. We have found that iron acetylacetonate may not give polymers having good properties.

The proportions of the compounds used for the preparation of the catalysts vary in the following limits. For 1 mole of a compound of a metal of the groups VII and VIII, it is necessary to take from 0.5 to 5.0 moles of the organosodium compound and from 0.05 to 1.0 mole of an organozinc or organocadmium compound. We have found that the optimal proportions are, for 1 mole of a compound of a metal of the groups VII and VIII, from 1 to 3 moles of an organosodium compound and from 0.1 to 0.4 mole of an organozinc or organocadmium compound.

The polymerization of butadiene occurs in the presence of a solvent and preferably in the presence of an aliphatic hydrocarbon such as pentane. When liquid butadiene is polymerized, the quantity of solvent may be reduced to the minimum volume necessary for handling the catalyst.

The polymerization temperature is comprised between —40 and +40° C. and preferably of about 20° C. The pressure is always lower than 5 atmospheres and preferably of about 1.5 atmospheres. When the polymerization occurs at atmospheric pressure, the temperature must be maintained under the boiling point of the 1,3-butadiene.

The polymerization is completed after from 4 to 24 hours and generally after 20 hours.

The catalyst is introduced in the reaction medium before or during the polymerization. When a solvent is used, the catalyst must be present before the butadiene is added.

When the polymerization is completed, the catalyst is decomposed by an aliphatic alcohol. The polymer is washed with an ethanolic solution of hydrochloric acid, then with water and finally with ethanol.

To avoid the degradation of the polymer during its drying, an anti-oxidant such as beta-phenylnaphthylamine is added to the ethanol.

The polymers prepared according to our invention are non-sticky solids whose greater part is insoluble in boiling diethyl ether. Infra-red spectra of these polymers show that they contain at least 70% of 1,2-addition units.

The said polymers are useful for making various articles using compression or injection moulding, extrustion in sheets, tubes or threads, wire-drawing by melting or starting from solutions.

The following examples disclose several applications of the invention, but they do not limit it in any way.

Example 1

100 g. of pure 1,3-butadiene are liquified at —40° C. in a glass container. One adds thereto by stirring a catalyst prepared by reacting 25 millimoles of amylsodium and 3 millimoles of diethylzinc with 10 millimoles of anhydrous ferric chloride in 60 ml. of pentane. The mixture is stirred for 1 hour at —40° C. Then the temperature rises slowly to evaporate the excess of the monomer. After 24 hours, the reaction product is treated with ethanol. The filtered polymer is washed with an ethanolic solution of hydrochloric acid and then with water to dissolve the formed salts. The last washing is effected with an ethanolic solution of beta-phenylnaphthylamine. Finally, the polymer is dried at room temperature. 45 g. of a white solid are obtained. The 1,2-addition units ratio is of 73%. 56% of the polymer are insoluble in boiling ether.

Example 2

10 millimoles of anhydrous ferric chloride are added to a mixture of 25 millimoles of amylsodium in 150 ml. of pentane. The catalyst so prepared is transferred in an iron pressure-resisting tube fitted with a manometer and having a capacity of 280 ml. On the cover is placed a pressure reducing valve. The tube is placed in a vertical position and the base is connected with a cylinder of 1,3-butadiene. A flow of gaseous 1,3-butadiene is passed through the tube to remove the air remaining in it. Then the pressure reducing valve is shut down and butadiene is introduced until the pentane is saturated under a pressure of 1.5 kg. by square centimeter. This pressure is maintained during 20 hours at a temperature of 20° C. The excess of gas is driven off by the upper part of the tube. The reaction product contained in the tube is washed with ethanol to decompose the catalyst. The purification of the polymer is made as described in Example 1. 30 g. of a solid product with 74% of 1,2-addition units are obtained. 36% of the polymer are insoluble in boiling ether.

Example 3

A catalyst is prepared by reacting 20 millimoles of ferric chloride with a mixture of 25 millimoles of amylsodium and 1.15 millimoles of diethylcadmium. The conditions of the polymerization are the same as in Example 2. After washings, 9 g. of a polymer are obtained whose 79% are insoluble in boiling ether and with 74% of 1,2-addition units.

Example 4

A catalyst is prepared by reacting 10 millimoles of ferric chloride with a mixture of 25 millimoles of amylsodium and 1.2 millimoles of diethylzinc. The conditions of the polymerization are the same as in Example 2. After washings, 13 g. of a polymer are obtained whose 85% are insoluble in boiling ether and with 72% of 1,2-addition units.

Example 5

A catalyst is prepared by reacting 10 millimoles of nickel acetylacetonate with a mixture of 25 millimoles of amylsodium and 3.16 millimoles of diethylcadmium. The conditions of the polymerization are the same as in Example 2. After washings, 15 g. of a polymer are obtained whose 55% are insoluble in boiling ether and with 72% of 1,2-addition units.

Example 6

A catalyst is prepared by reacting 10 millimoles of anhydrous cobalt chloride with 25 millimoles of amylsodium. The conditions of the polymerization are the same as in Example 2. After washings, 11 g. of a polymer are obtained whose 36% are insoluble in boiling ether and with 73% of 1,2-addition units.

When the catalyst is prepared from 10 millimoles of anhydrous cobalt chloride, 3.16 millimoles of diethylcadmium and 25 millimoles of amylsodium, the proportion of the polymer insoluble in boiling ether is of 83%.

Example 7

A catalyst is prepared by reacting 10 millimoles of anhydrous manganese dichloride ($MnCl_2$) with 25 millimoles of amylsodium. The conditions of the polymerization are the same as in Example 2. 10 g. of a polymer are obtained whose 33% are insoluble in boiling ether and with 75% of 1,2-addition units.

When the catalyst is prepared from 10 millimoles of anhydrous manganese dichloride, 3.16 millimoles of diethylcadmium and 25 millimoles of amylsodium, the proportion of the polymer insoluble in boiling either is of 70%.

We claim:

1. Process for preparing polybutadiene in the form of a non-sticky solid with a 1,2-addition units ratio greater than 70% which comprises contacting 1,3-butadiene with a catalyst which consists essentially of the product from 0.5 to 5 moles of amylsodium and from 1 mole of a compound selected from the group consisting of manganese, iron, nickel and cobalt chlorides and nickel and cobalt acetylacetonates, said contacting being carried out at a temperature between —40° and +40° C., under a pressure not exceeding 5 atmospheres and in the presence of an aliphatic hydrocarbon as solvent.

2. Process for preparing polybutadiene in the form of a non-sticky solid with a 1,2-addition unit ratio greater than 70% which comprises contacting 1,3-butadiene with a catalyst which consists essentially of the product from 0.5 to 5 moles of amylsodium, from 1 mole of a compound selected from the group consisting of manganese, iron, nickel and cobalt chlorides, nickel acetylacetonate and cobalt acetylacetone and from 0.05 to 1 mole of a compound selected from the group consisting of diethylcadmium and diethylzinc, said contacting being carried out at a temperature between —40° and +40° C., under a pressure not exceeding 5 atmospheres and in the presence of an aliphatic hydrocarbon as solvent.

3. The catalytic polymerization of 1,3-butadiene comprising contacting said butadiene with a catalyst in the presence of an aliphatic hydrocarbon as solvent at a temperature between —40° and +40° C. and at a pressure of at most 5 atmospheres, said catalyst consisting essentially of the reaction product of (a) from 0.5 to 5 moles of amylsodium, and (b) 1 mole of a compound selected from the group consisting of manganese chloride, iron chloride, nickel chloride, cobalt chloride, nickel acetylacetonate and cobalt acetylacetonate, whereby solid non-sticky polybutadiene having a ratio of 1,2-addition units in excess of 70% is formed.

4. The catalytic polymerization of 1,3-butadiene comprising contacting said butadiene with a catalyst in the presence of an aliphatic hydrocarbon as solvent at a temperature between —40° and +40° C. and at a pressure of about 1.5 atmospheres, said catalyst consisting essentially of the reaction product of (a) from 1 to 3 moles of amylsodium, (b) 1 mole of a compound selected from the group consisting of manganese chloride, iron chloride, nickel chloride, cobalt chloride, nickel acetylacetonate and cobalt acetylacetonate, and (c) from 0.1 to 0.4 mole of a member selected from the group consisting of diethylcadmium and diethylzinc, whereby solid non-sticky polybutadiene having a ratio of 1,2-addition units in excess of 70% is formed.

5. A catalyst which consists essentially of the reaction product of (a) from 0.5 to 5 molecular equivalents of amyl sodium and (b) 1 molecular equivalent of a compound selected from the group consisting of manganese chloride, iron chloride, nickel chloride, cobalt chloride, nickel acetylacetonate and cobalt acetylacetonate.

6. A catalyst which consists essentially of the reaction product of (a) from 1 to 3 molecular equivalents of amylsodium, (b) 1 molecular equivalent of a compound selected from the group consisting of manganese chloride, iron chloride, nickel chloride, cobalt chloride, nickel acetylacetonate and cobalt acetylacetonate and (c) from 0.1 to 0.4 molecular equivalent of a member selected from the group consisting of diethylcadmium and diethylzinc.

7. The catalytic polymerization of 1,3-butadiene comprising contacting said butadiene with catalyst in the presence of an aliphatic hydrocarbon as solvent at a temperature between —40° and +40° C. and at the pressure of at most 5 atmospheres, said catalyst consisting essentially of the reaction product of (a) 25 molecular equivalents of amyl sodium, (b) 10 molecular equivalents of anhydrous ferric chloride and (c) 3 molecular equivalents of diethylzinc, whereby solid non-sticky polybutadiene having a ratio of 1,2-addition units in excess of 70% is formed.

8. The catalytic polymerization of 1,3-butadiene comprising contacting said butadiene with a catalyst in the presence of an aliphatic hydrocarbon as solvent at a temperature between —40° and +40° C. and at a pressure of at most 5 atmospheres, said catalyst consisting essentially of the reaction product of (a) 25 molecular equivalents of amyl sodium and (b) 10 molecular equivalents of anhydrous ferric chloride, whereby solid non-sticky polybutadiene having a ratio of 1,2-addition units in excess of 70% is formed.

9. The catalytic polymerization of 1,3-butadiene comprising contacting said butadiene with a catalyst in the presence of an aliphatic hydrocarbon as solvent at a temperature between —40° and +40° C. and at a pressure of at most 5 atmospheres, said catalyst consisting essentially of the reaction product of (a) 25 molecular equivalents of amyl sodium, (b) 20 molecular equivalents of ferric chloride and (c) 1.15 molecular equivalents of diethylcadmium, whereby solid non-sticky polybutadiene having a ratio of 1,2-addition units in excess of 70% is formed.

10. The catalytic polymerization of 1,3-butadiene comprising contacting said butadiene with a catalyst in the presence of an aliphatic hydrocarbon as solvent at a temperature between —40° and +40° C. and at a pressure of at most 5 atmospheres, said catalyst consisting essentially of the reaction product of (a) 25 molecular equivalents of amyl sodium, (b) 10 molecular equivalents of ferric chloride and (c) 1.2 molecular equivalents of diethylzinc, whereby solid non-sticky polybutadiene having a ratio of 1,2-addition units in excess of 70% is formed.

11. The catalytic polymerization of 1,3-butadiene comprising contacting said butadiene with a catalyst in the presence of an aliphatic hydrocarbon as solvent at a temperature between —40° and +40° C. and at a pressure of at most 5 atmospheres, said catalyst consisting essentially of the reaction product of (a) 25 molecular equivalents of amyl sodium, (b) 10 molecular equivalents of nickel acetylacetonate and (c) 3.16 molecular equivalents of diethylcadmium, whereby solid non-sticky polybutadiene having a ratio of 1,2-addition units in excess of 70% is formed.

12. The catalytic polymerization of 1,3-butadiene comprising contacting said butadiene with a catalyst in the presence of an aliphatic hydrocarbon as solvent at a temperature between −40° and +40° C. and at a pressure of at most 5 atmospheres, said catalyst consisting essentially of the reaction product of (a) 25 molecular equivalents of amyl sodium and (b) 10 molecular equivalents of anhydrous cobalt chloride, whereby solid non-sticky polybutadiene having a ratio of 1,2-addition units in excess of 70% is formed.

13. The catalytic polymerization of 1,3-butadiene comprising contacting said butadiene with a catalyst in the presence of an aliphatic hydrocarbon as solvent at a temperature between −40° and +40° C. and at a pressure of at most 5 atmospheres, said catalyst consisting essentially of the reaction product of (a) 25 molecular equivalents of amyl sodium, (b) 10 molecular equivalents of anhydrous cobalt chloride and (c) 3.16 molecular equivalents of diethylcadmium, whereby solid non-sticky polybutadiene having a ratio of 1,2-addition units in excess of 70% is formed.

14. The catalytic polymerization of 1,3-butadiene comprising contacting said butadiene with a catalyst in the presence of an aliphatic hydrocarbon as solvent at a temperature between −40° and +40° C. and at a pressure of at most 5 atmospheres, said catalyst consisting essentially of the reaction product of (a) 25 molecular equivalents of amyl sodium and (b) 10 molecular equivalents of anhydrous manganese dichloride ($MnCl_2$), whereby solid non-sticky polybutadiene having a ratio of 1,2-addition units in excess of 70% is formed.

15. The catalytic polymerization of 1,3-butadiene comprising contacting said butadiene with a catalyst in the presence of an aliphatic hydrocarbon as solvent at a temperature between −40° and +40° C. and at a pressure of at most 5 atmospheres, said catalyst consisting essentially of the reaction product of (a) 25 molecular equivalents of amyl sodium, (b) 10 molecular equivalents of anhydrous manganese dichloride and (c) 3.16 molecular equivalents of diethylcadmium, whereby solid non-sticky polybutadiene having a ratio of 1,2-addition units in excess of 70% is formed.

References Cited in the file of this patent

UNITED STATES PATENTS

| | | |
|---|---|---|
| 2,832,759 | Nowlin et al. | Apr. 29, 1958 |
| 2,905,659 | Miller | Sept. 22, 1959 |
| 2,920,062 | McFarland | Jan. 5, 1960 |
| 2,977,349 | Brockway | Mar. 28, 1961 |

FOREIGN PATENTS

| | | |
|---|---|---|
| 543,292 | Belgium | June 2, 1956 |
| 779,111 | Great Britain | July 17, 1957 |
| 789,781 | Great Britain | Jan. 29, 1958 |